(12) United States Patent
Pinsenschaum et al.

(10) Patent No.: US 6,585,290 B2
(45) Date of Patent: Jul. 1, 2003

(54) DIFFUSER FOR AN AIR BAG

(75) Inventors: Ryan T. Pinsenschaum, Vandalia, OH (US); Domini T. Malcom, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/930,916

(22) Filed: Aug. 16, 2001

(65) Prior Publication Data

US 2002/0027350 A1 Mar. 7, 2002

Related U.S. Application Data (60) Provisional application No. 60/229,431, filed on Aug. 31, 2000.

(51) Int. Cl.[7] .............................................. B60R 21/16
(52) U.S. Cl. ................. 280/740; 280/743.1; 280/743.2; 280/729
(58) Field of Search ................. 280/740, 729, 280/743.1, 743.2, 742

(56) References Cited

U.S. PATENT DOCUMENTS

| | | | |
|---|---|---|---|
| 3,900,210 A | 8/1975 | Lohr et al. ............. 280/150 AB |
| 5,172,933 A * | 12/1992 | Strasser ...................... 280/732 |
| 5,282,646 A * | 2/1994 | Melvin et al. ............ 280/728.1 |
| 5,464,250 A * | 11/1995 | Sato ......................... 280/730.1 |
| 5,489,119 A | 2/1996 | Prescaro et al. ......... 280/743.2 |
| 5,494,314 A | 2/1996 | Kriska et al. ............... 280/740 |
| 5,560,649 A * | 10/1996 | Saderholm et al. ......... 280/739 |
| 5,573,270 A | 11/1996 | Sogi et al. .................. 280/740 |
| 5,593,179 A | 1/1997 | Maruyama .................. 280/740 |
| 5,803,121 A | 9/1998 | Estes ........................... 137/849 |
| 5,913,535 A | 6/1999 | Taguchi et al. ............. 280/729 |
| 5,941,559 A * | 8/1999 | Rudolf et al. ............... 280/729 |
| 5,951,038 A | 9/1999 | Taguchi et al. ............. 280/729 |
| 6,089,599 A | 7/2000 | Schimmoller et al. ....... 280/740 |
| 6,189,915 B1 * | 2/2001 | Soderquist et al. ....... 280/728.2 |
| 6,247,727 B1 * | 6/2001 | Hamada et al. .......... 280/743.1 |
| 6,260,881 B1 * | 7/2001 | Ellerbrok et al. ........ 280/728.1 |
| 6,361,067 B1 * | 3/2002 | Varcus et al. ............... 280/729 |
| 6,382,662 B1 * | 5/2002 | Igawa ......................... 280/729 |

FOREIGN PATENT DOCUMENTS

| | | |
|---|---|---|
| EP | 0600598 A1 | 6/1994 |
| EP | 0835786 A1 | 4/1998 |
| EP | 0 933 266 A2 * | 8/1999 |
| JP | 1-247242 A * | 10/1989 |
| JP | 1-311930 A * | 12/1989 |
| JP | 5-262195 A * | 10/1993 |

* cited by examiner

*Primary Examiner*—Paul N. Dickson
*Assistant Examiner*—Ruth Ilan
(74) *Attorney, Agent, or Firm*—Kathryn A. Marra (57) ABSTRACT

An air bag module including a cushion, a diffuser and an inflator is provided. The cushion is expandable radially and rearward of the air bag module. The diffuser is disposed in the cushion and is also expandable radially and rearward of the air bag module. The diffuser includes a vent in fluid communication with the cushion. The inflator generates an inflator gas exhaustible into the diffuser to deploy the cushion. The inflation gas is receivable by the diffuser for expanding the cushion and the diffuser to a first predetermined position. The vent is positioned downstream of the interior surfaces when the diffuser is at the first predetermined position. The inflation gas is diffusible by the diffuser through the vent to radially expand the cushion after the rearward expansion to the first predetermined position. The cushion is further expandable rearward to a second predetermined position after the radial expansion of the cushion.

16 Claims, 6 Drawing Sheets

DIFFUSER FOR AN AIR BAG

CROSS REFERENCE TO RELATED APPLICATION

This application claims benefit of provisional application Serial No. 60/229,431 filed on Aug. 31, 2000, the contents of which are incorporated herein in their entirety.

TECHNICAL FIELD

This application relates generally to air bags for vehicles. More specifically, this application relates to a diffuser for diffusing inflator gas during deployment of an air bag.

BACKGROUND

Air bags have become common in modern automobiles. An air bag module including an inflatable cushion and an inflator is installed in the desired position within the vehicle. The cushion is stored in a folded position within the air bag module. In response to a threshold event or occurrence, a sensor provides a signal for activating the inflator. The inflator provides a supply of inflating gas to the cushion to inflate the cushion.

There are several types of inflators for air bag modules. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gas flow through an outlet to the cushion. A third type is the hybrid or augmented type. This type includes a pressure vessel containing stored pressurized gas and a gas generator. When the generator is ignited, the resultant gas flows with the stored gas to the cushion through the pressure vessel outlet.

Tethers within the cushion have been used to limit the rearward excursion and biasing of the air bag cushion. As used in this application, rearward excursion is expansion of the air bag cushion inboard of the vehicle in a centralized manner and biasing is for the expansion of the cushion off center or in a particular direction. Thus, tethers provide for reduction or set a limit for rearward excursion and provide for a reduction or limit in the biasing of the cushion.

SUMMARY

An air bag module including an inflator, a cushion, and a flexible diffuser is provided. The inflator generates an inflator gas for deploying the cushion. The flexible diffuser is folded to a generally parachute shape for diffusing the inflator gas during deployment of the cushion.

An air bag module including a cushion and a diffuser is provided. The cushion is expandable radially and rearward of the air bag module. Similarly, the diffuser is expandable radially and rearward of the air bag module and is disposed in the cushion. The diffuser includes at least one vent in fluid communication with the cushion. An inflation gas exhaustible into the diffuser deploys the cushion. The inflation gas expands the cushion and the diffuser rearward to a first predetermined distance. The vent is positioned downstream of the interior surfaces when the diffuser is at the first predetermined distance. The inflation gas is diffused by the diffuser through the vent to radially expand the cushion after the rearward expansion to the first predetermined distance. The cushion is further expandable rearward to a second predetermined distance after the radial expansion of the cushion.

A rectangular diffuser in an air bag cushion is provided. The rectangular diffuser includes a pair of minor edges, a pair of length-wise edges, and a fold. The fold approximately bisects the pair length-wise edges such that the pair of minor edges are adjacent one another. The fold forms a pair of sealed top corners at the fold and an opening at the minor edges. A curved seam is sewn at the pair of top corners. Vents are positioned in the diffuser downstream of the interior surfaces.

A box shaped diffuser in an air bag cushion is provided. The box shaped diffuser includes a flexible material having a first edge, a second edge, a third edge, a fourth edge and four corners. A vertical fold line approximately bisects the first edge and the second edge, forming left and right sections of each of the first and second edges. Similarly, a horizontal fold line approximately bisects the third edge and the fourth edge, forming upper and lower sections of each of the third and fourth edges. A diagonal fold at each of the four corners is sealed with a corner seam. An opening formed at the corner seams by sealing: (1) the left section and the right section of the first edge to one another with a first seam; (2) the left section and the right section of the second edge to one another with a second seam; (3) the upper section and the lower section of the third edge to one another with a third seam; and (4) the upper section and the lower section of the fourth edge to one another with a fourth seam. Vents are positioned in the diffuser downstream of the interior surfaces.

The above-described and other features and advantages of the present invention will be appreciated and understood by those skilled in the art from the following detailed description, drawings, and appended claims.

DESCRIPTION OF THE PREFERRED EMBODIMENT

Figure 1:
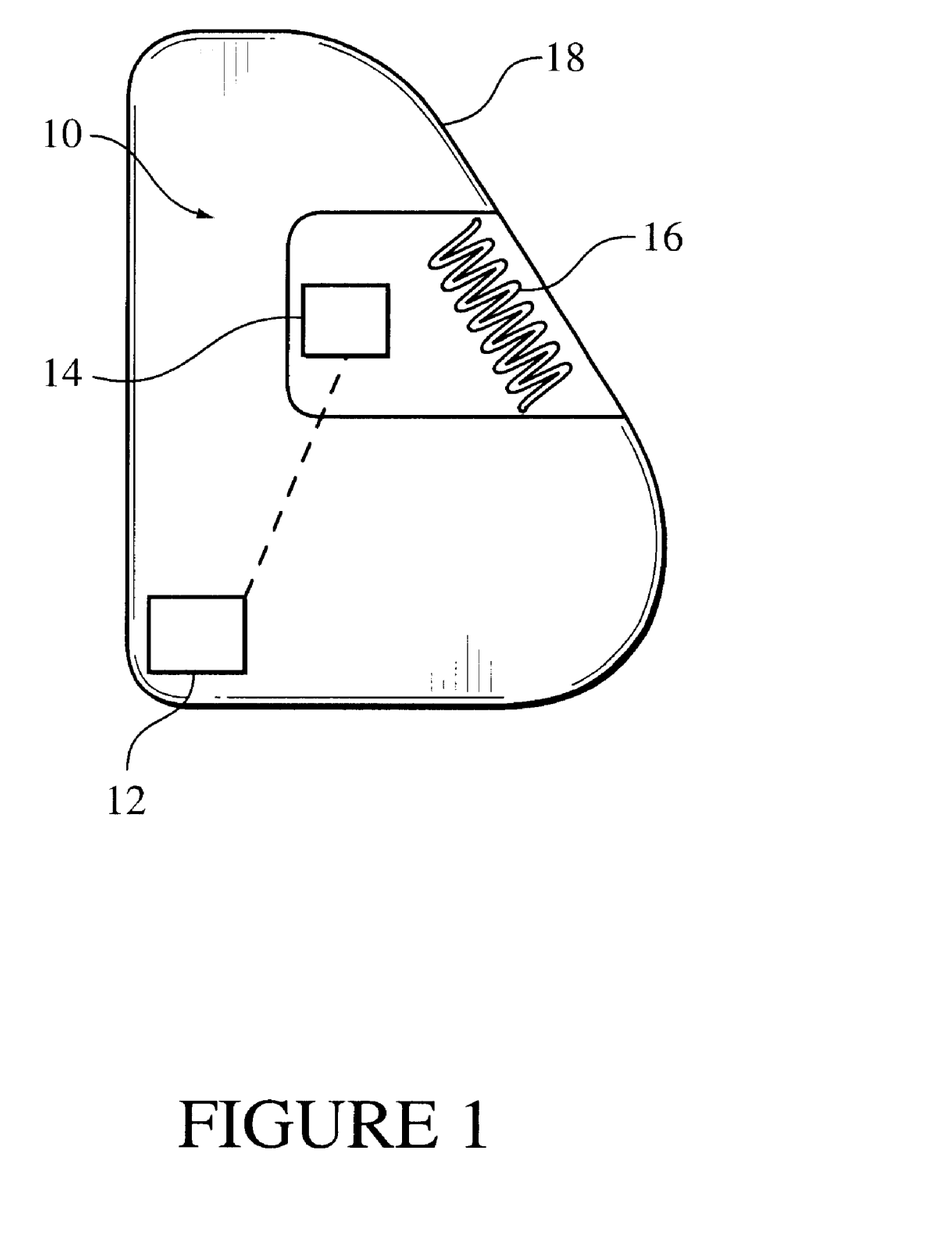
FIG. 1 is a cross sectional view of an air bag module installed in the dashboard of a vehicle.

Referring to the Figures and particularly to FIG. 1, an air bag module 10 is illustrated. Module 10 includes an inflator 14 and an inflatable cushion 16 in a cavity defined in a dashboard or interior surface 18 of a vehicle (not shown). A sensor 12 is adapted to detect an activation event to provide an activation signal to inflator 14 or alternatively a sensing and diagnostic module for controlling the activation of the airbag module. Sensor 12 or a plurality of sensors are positioned to detect vehicle conditions and generate a signal to the inflator or sensing and diagnostic module. Cushion 16 is stored in a folded position in module 10 and is in fluid communication with inflator 14. Thus upon activation of inflator 14, cushion 16 is adapted to inflate.

Figure 2:
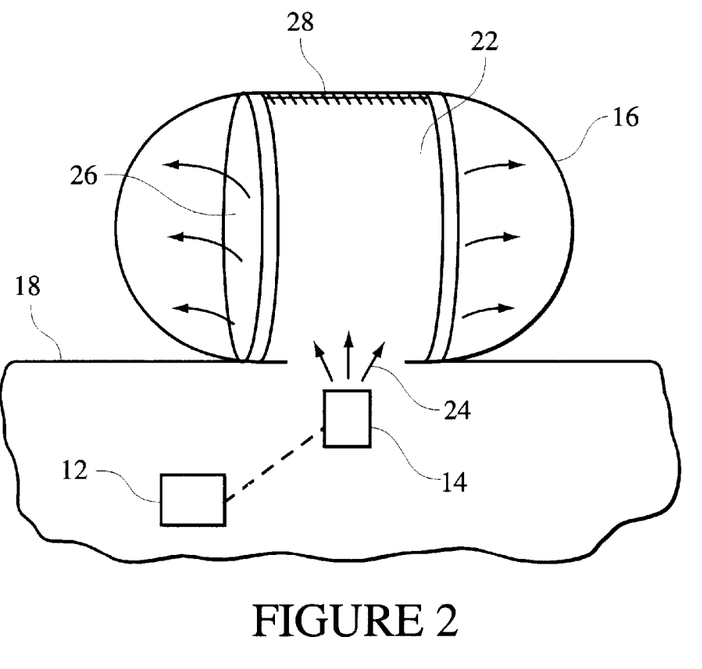
FIG. 2 is a cross sectional view of a first embodiment of a diffuser showing a partially deployed cushion.

Cushion 16 includes a diffuser 22, shown in FIGS. 2–11, disposed in the cushion. Diffuser 22 is made of flexible material, preferably fabric, and is operatively positioned in cushion 16 between the cushion and inflator 14 such that inflation gases 24 exhausted from the inflator enter the diffuser. Diffuser 22 creates a parachute effect for inflation gas 24 within cushion 16. Namely, upon actuation of inflator 14, gas 24 enters diffuser 22 causing the diffuser and cushion 16 to expand rearward and radially as shown in FIG. 2. Radial expansion of cushion 16 is created by the flow of gas 24 through a plurality of vents 26. The expansion of cushion 16 is radially limited by the size of the cushion, and initially limited rearward by the size of diffuser 22.

Figure 3:
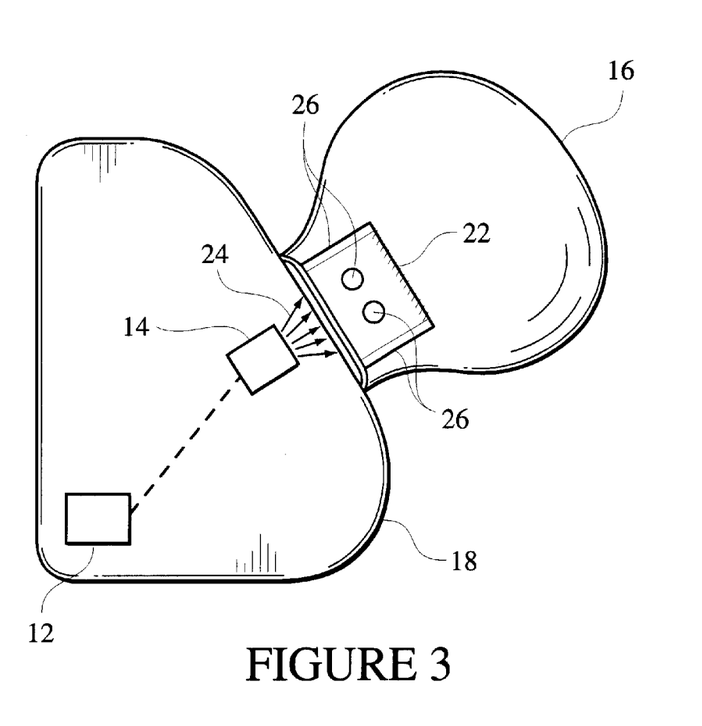
FIG. 3 is a cross sectional view of an alternate embodiment of a diffuser in a fully deployed cushion.

Thus, once cushion 16 is radially expanded, gas 24 causes the cushion to expand rearward to its outer limit, shown in FIG. 3. Here, diffuser 22 creates its parachute effect by initially capturing gas 24 such that the diffuser is fully expanded rearward, while cushion 16 is only partially expanded rearward. Gas 24 is vented through vents 26 to radially expand cushion 16. After radial expansion of cushion 16, the cushion is expanded rearward to its outer limit.

The parachute effect described above will reduce or set a limit for rearward excursion and biasing of cushion 16 during deployment. The parachute effect also provides for quick radial coverage of interior surfaces, and provides a thermal barrier for cushion 16 from heat in gas 24.

In an alternate embodiment, diffuser 22 is releasably connected to cushion 16 by breakaway stitching 28. Breakaway stitching is adapted to secure cushion 16 and diffuser 22 such that the stitching allows for complete expansion of the cushion rearward after the cushion is radially expanded. Thus, stitching 28 aids diffuser 22 in setting a limit for or reducing rearward excursion of cushion 16 until the cushion is radially expanded.

Diffuser 22, illustrated in FIGS. 2–5, is a rectangular diffuser 30. A preferred embodiment of rectangular diffuser 30 is shown in a raw or incomplete state in FIG. 4 and in a complete state in FIG. 5. Shown in FIG. 4, rectangular diffuser 30 has minor edges 32 and length-wise edges 34. Optionally, length-wise edges 34 are folded over to provide strength for seams to be discussed below. Rectangular diffuser 30 is folded along axis 36 such that minor edges 32 are adjacent one another, shown in FIG. 5. Axis 36 bisects length-wise edges 34 about halfway of the length of the lengthwise edges. For purposes of clarity, folding axes are shown as single dotted lines, while seams are shown as double dotted lines.

Figure 4:
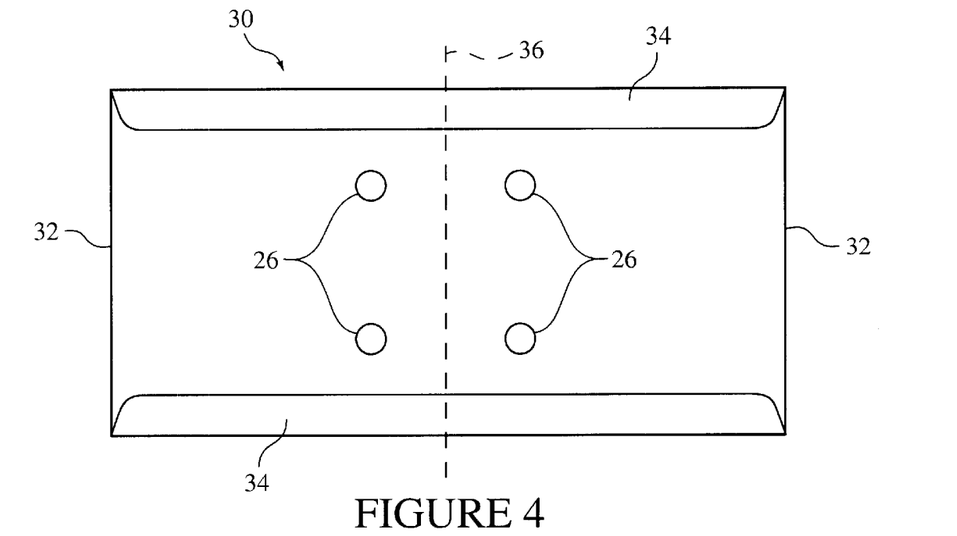
FIG. 4 is a top view of the diffuser of FIG. 3 in a raw or incomplete state.
Figure 5:
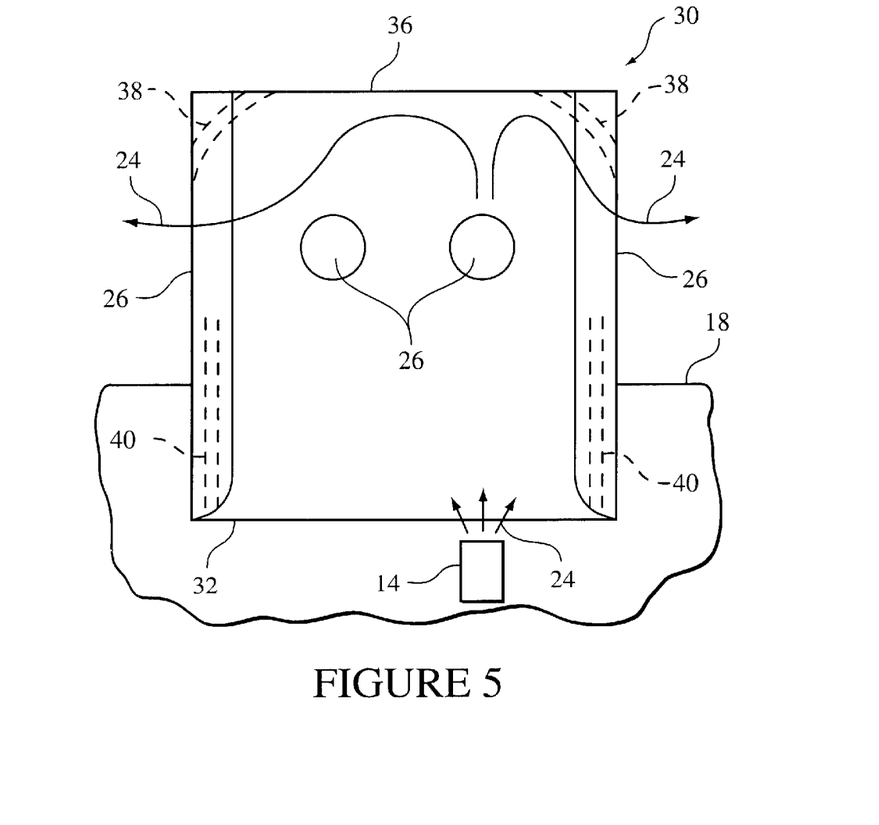
FIG. 5 is a side view of the diffuser of FIG. 3 in a complete, folded state, illustrating an alternate venting embodiment.

A quarter-circular seam 38 is sewn or otherwise provided (hereinafter sewn) at the corners on either end of axis 36. Rectangular diffuser 30 includes vents 26 provided in sufficient number so as to allow cushion 16 to expand and are positioned such that the vents are past dashboard 18 when the diffuser is expanded rearward to its outer limit. Vents 26 enable gas 24 to radially expand cushion 16 downstream of dashboard 18. Thus, rectangular diffuser 30 has its top end sealed by fold axis 36, its top corners sealed at seams 38, and vents 26, which all cooperate to provide the diffuser with the parachute effect described above. Moreover, rectangular diffuser 30 has its bottom end at minor edges 32 open to receive gas 24 from inflator 14.

In an alternate embodiment, a horizontal seam 40 is sewn on a bottom portion of each length-wise edge 34. Horizontal seams 40 are adapted to provide vents 26 with greater flow restriction capabilities, if needed.

Rectangular diffuser 30 illustrated in FIGS. 4 and 5 includes horizontal seams 40 restricting vents 26 and includes circular vents 26 disposed therein. In contrast, rectangular diffuser 30 illustrated in FIG. 2 has no horizontal seams restricting vents 26 and includes no circular vents 26, while the rectangular diffuser illustrated in FIG. 3 has no horizontal seams restricting vents 26 but does include circular vents 26. Of course, and as applications require other vents 26 disposed in rectangular diffuser 30 are considered within the scope of the present invention.

In use, inflator 14 is operatively positioned at the open end 32 of rectangular diffuser 30 such that the inflator is adapted to exhaust gas 24 into the diffuser. Rectangular diffuser 30 is operatively positioned in cushion 16 between the cushion and inflator 14 such that inflation gases 24 exhausted from the inflator enter the diffuser. Upon deployment of inflator 14, gas 24 enters rectangular diffuser 30 at open ends 32 and acts on sealed fold axis 36 causing the diffuser and the cushion to expand rearward past dashboard 18. Gas 24 is diffused, channeled or dispersed (hereinafter diffused) by curved seams 38 away from axis 36 toward vents 26. Radial expansion of cushion 16 is created by the flow of gas 24 through vents 26. Once cushion 16 is radially expanded, gas 24 causes the cushion to expand rearward to its outer limit. Thus, rectangular diffuser 30 creates the parachute effect described above.

In the embodiment of FIG. 2, rectangular diffuser 30 is releasably connected to cushion 16 along axis 36 by breakaway stitching 28. Breakaway stitching 28 is adapted to secure cushion 16 and rectangular diffuser 30 such that the stitching allows for complete rearward expansion of the cushion after the cushion is radially expanded.

An alternate exemplary embodiment of diffuser 22 is illustrated in FIGS. 6 through 11 as a box-shaped diffuser 42. Box shaped diffuser 42 is shown in a complete state in FIGS. 6–8 and in a raw or incomplete state in FIGS. 9–11. Diffuser 42 has edges 44, 46, 48 and 50 and a fold line along axis 52 and along axis 54. Axes 52, 54 bisect edges 44, 46, 48 and 50 to form first and second sections of each edge, shown as sections 56, 58, 60, 62, 64, 66, and 68, 70, respectively. Axes 52, 54 bisect edges 44, 46, 48, and 50 about halfway of the length of the edges. For purposes of clarity, folding axes are shown as single dotted lines, while seams are shown as double dotted lines.

Figure 9:
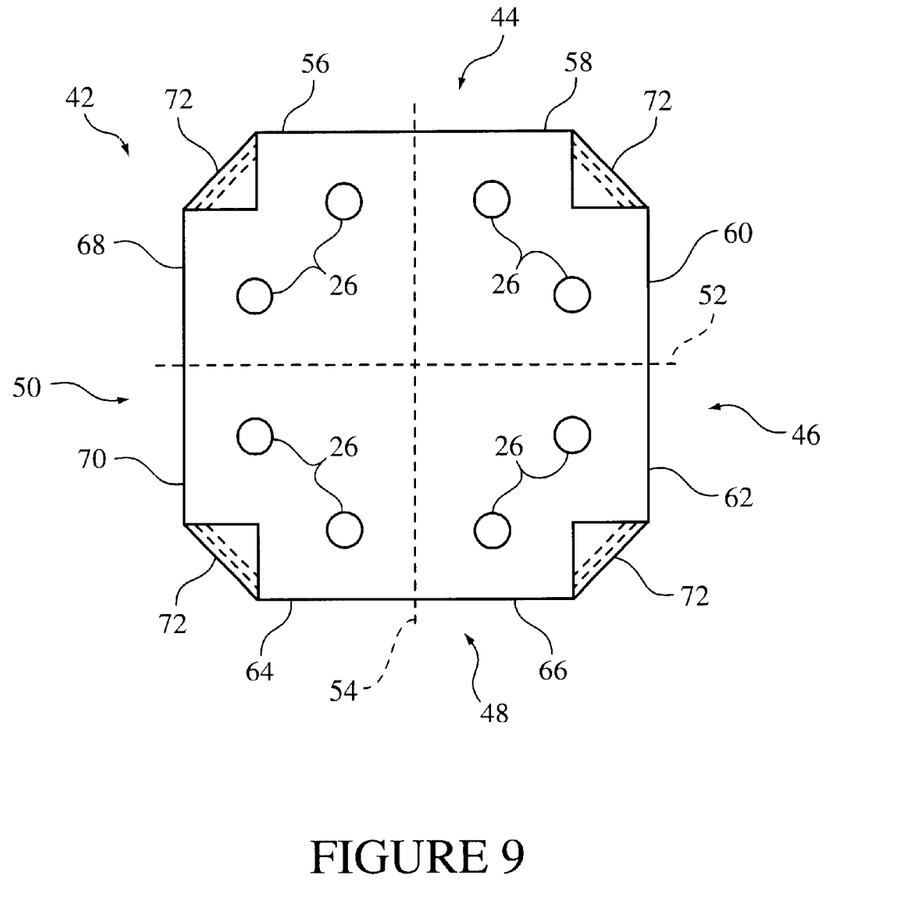
FIG. 9 is a top view of an embodiment of the diffuser prior in a raw, or incomplete state.

The corners of diffuser 42 are folded over diagonally and a seam 72 is sewn over the folded corners, as shown in FIG. 9. An opening 74 is formed at seams 72 by sealing the first and second sections of each edge to one another, namely 56 to 58, 60 to 62, 64 to 66, and 68 to 70.

Figure 10:
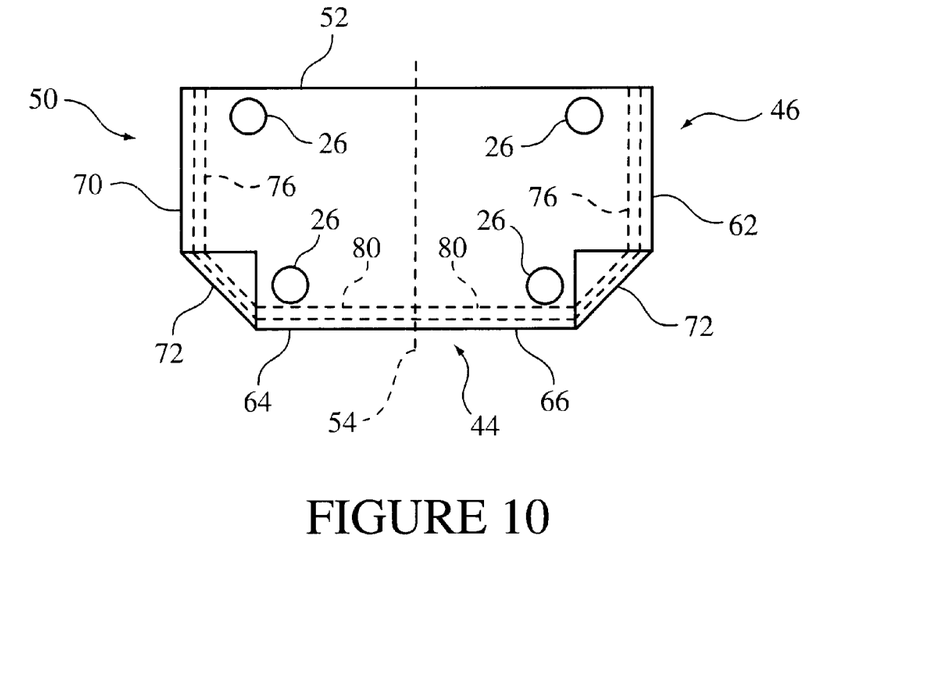
FIG. 10 is a first side view of the diffuser of FIG. 9 in a complete folded state.
Figure 11:
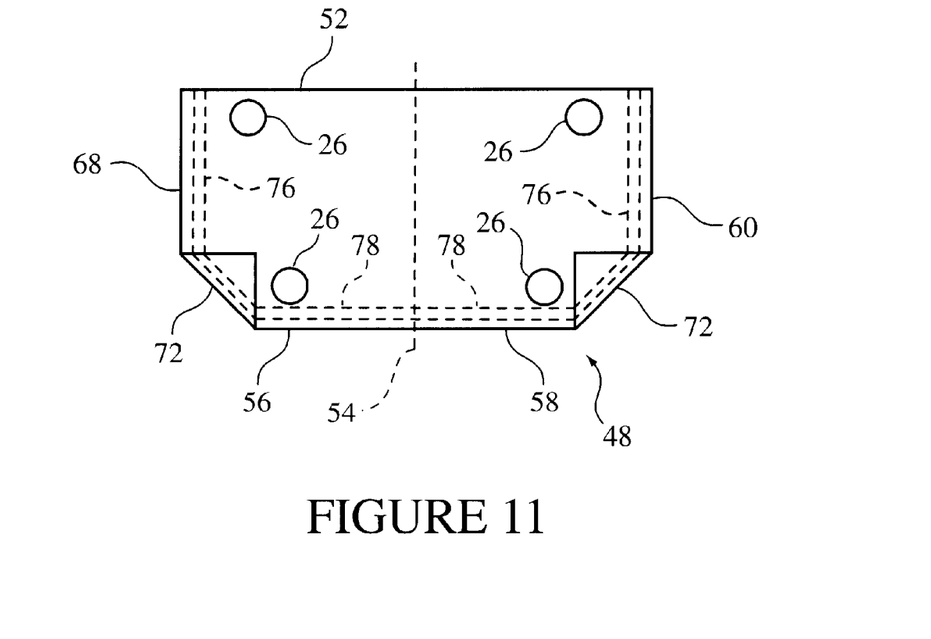
FIG. 11 is a second side view of the diffuser of FIG. 9 in a complete, folded state.

In order to form opening 74, diffuser 42 is folded in half along axis 52 such that edge 44 and edge 48 are adjacent one another, shown in FIGS. 10 and 11. Edge 50 is sewn with a seam 76 such that section 70 and section 68 are sealed to one another. Similarly, edge 46 is sewn with another seam 76 such that section 62 and 60 are sealed to one another. Next, edge 44 is pulled away from edge 48 folding the edges 44, 48 along fold axis 54 such that section 56 is adjacent section 58 and section 64 is adjacent 66. A seam 78 is sewn to seal section 56 and section 58. Similarly, a seam 80 is sewn to seal section 64 and section 66. Thus, box-shaped diffuser 42 appears as a box with opening 74 at corner seams 72.

Diffuser 42 includes vents 26 provided in sufficient number so as to allow cushion 16 to expand rearward and are positioned such that when the diffuser is extended rearward to its outer limit, the vents are past dashboard 18. Vents 26 enable gas 24 to radially expand cushion 16 downstream of dashboard 18. Thus, diffuser 42 provides the parachute effect as a result of the cooperation of its top end being sealed by axes 52, 54, ends 46, 50 being sealed at seams 76, section 64 being sealed to section 66, section 56 being sealed to 58, and the placement of vents 26. Moreover, diffuser 42 includes opening 74 adapted to receive gas 24 from inflator 14.

In use, inflator 14 is operatively positioned at opening 74 of box-shaped diffuser 42 such that the inflator is adapted to exhaust gas 24 into the diffuser. Diffuser 42 is operatively positioned in cushion 16 between the cushion and inflator 14 such that inflation gases 24 exhausted from the inflator enter the diffuser. Upon deployment of inflator 14, gas 24 enters diffuser 42 at opening 74 and acts on fold lines 52, 54, and seams 76, 78, and 80 causing the diffuser and the cushion to expand rearward past dashboard 18. Gas 24 is diffused in box-shaped diffuser 42 toward vents 26. Radial expansion of cushion 16 is created by the flow of gas 24 through vents 26. Once cushion 16 is radially expanded, gas 24 causes the cushion to expand rearward to its outer limit. Thus, rectangular diffuser 22 creates the parachute effect described above.

Figure 6:
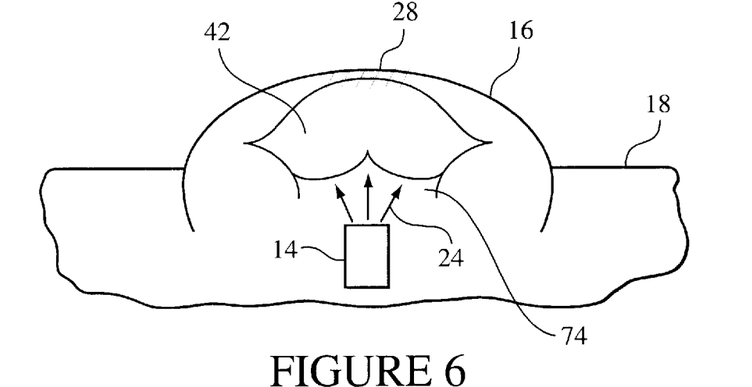
FIG. 6 is a cross sectional view of another embodiment of a diffuser shown in a partially deployed cushion.
Figure 7:
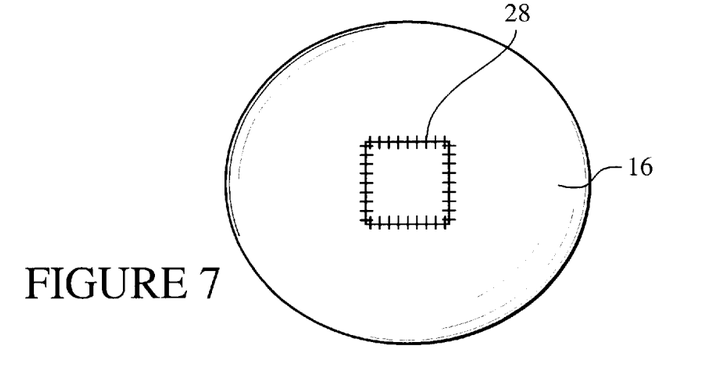
FIG. 7 is a top view of the diffuser of FIG. 6.
Figure 8:
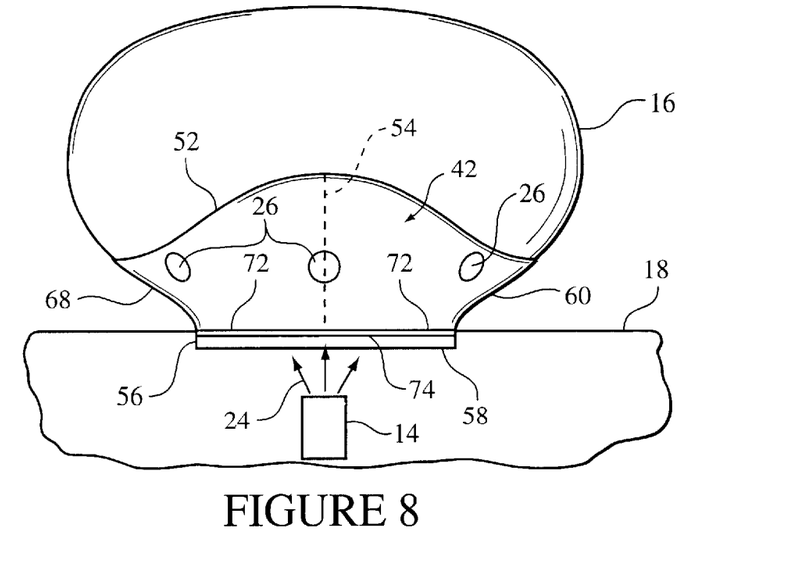
FIG. 8 is a cross sectional view of the diffuser of FIG. 6 showing a fully deployed cushion.

In the embodiment of FIG. 6, box-shaped diffuser 42 is releasably connected to cushion 16 along fold axis 52 or 54 by breakaway stitching 28. Breakaway stitching 28 is adapted to secure cushion 16 and diffuser 42 such that the stitching allows for complete rearward expansion of the cushion after the cushion is radially expanded.

It should be recognized that diffuser 22 is described above by way of example as rectangular diffuser 30 and box-shaped diffuser 42 and is not limited to such shapes. Rather, diffuser 22 of any shape configured to provide the parachute effect described above is considered within the scope of the present invention. Additionally, diffuser 22 is described above by way of example as mounted in a dashboard. However, it should be recognized that diffuser 22 is intended for use with air bags mounted not only in dashboards, but also mounted in other portions of the vehicle.

Diffuser 22 radially dissipates inflation gas 24 upon partial rearward deployment of cushion 16 prior to complete rearward deployment of the cushion. Radially dissipating gas 24 reduces rearward excursion and increases coverage of interior surfaces. Moreover, diffuser 22 reduces or sets a limit for the biasing of cushion 16, thus, replacing other types of biasing controlling devices and/or means, such as tethers, canister diffusers, and the like. Diffuser 22 also provides a thermal barrier to deflect heat contained within gas 24 from cushion 16.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air bag module, comprising:
   an inflator for inflating an inflatable cushion of the airbag module; and
   a diffuser being disposed within said inflatable cushion, said diffuser providing a means for limiting deployment of the inflatable cushion in one direction while assisting in deployment of the inflatable cushion in another direction, said diffuser comprising a flexible material having a rectangular shape with four corners defining four edges wherein each of said four edges is defined into a pair of sections and each of said corners are folded and secured onto said rectangular shape to define four opening edges wherein each of said pair of sections are secured to each other resulting in a diffuser opening being defined by said four opening edges, said diffuser further comprising a plurality of vent openings and said diffuser opening being in fluid communication with said inflator.

2. The air bag module of claim 1, wherein said plurality of vent openings allow flow of inflation fluids generated by said inflator in a radial or cross car direction and said diffuser limits the flow of inflation fluids generated by said inflator in a rearward direction.

3. The air bag module of claim 1, wherein said inflatable cushion is releasably connected to said diffuser by breakaway stitching.

4. The air bag module of claim 1, wherein each of said corners are folded and secured onto said rectangular shape by a plurality of stitches and each of said pair of sections are secured to each other by a plurality of stitches.

5. The diffuser as in claim 1, wherein the diffuser is positioned within the inflatable cushion in an un-expanded state and said plurality of vent openings are positioned above a surface of a vehicle in which the airbag module is installed when the inflatable cushion is deployed and the diffuser expands to an expanded state.

6. The diffuser as in claim 1, wherein the diffuser provides a thermal barrier between the inflator and at least one surface of the inflatable cushion.

7. The diffuser as in claim 1, wherein the diffuser opening is rectangular.

8. A box shaped diffuser in an air bag cushion, comprising:
   a first edge, a second edge, a third edge, and a fourth edge, said first, second, third and fourth edges defining corners;
   a first fold line approximately bisecting said first edge and said second edge, defining a left section and a right section of said first edge and a left section and a right section of said second edge;
   a second fold line approximately bisecting said third edge and said fourth edge, defining an upper section and a lower section of said third edge and an upper section and a lower section of said fourth edge;
   a diagonal fold at each of said corners, said diagonal fold being sealed with a corner seam;
   an opening formed at said corner seams by sealing said left section and said right section of said first edge to one another with a first seam, said left section and said right section of said second edge to one another with a second seam, said upper section and said lower section of said third edge to one another with a third seam, and said upper section and said lower section of said fourth edge to one another with a fourth seam; and
   one or more vents positioned on the diffuser, said opening being positionable to receive an inflation gas and said one or more vents being in fluid communication with the air bag cushion.

9. The box shaped diffuser of claim 8, wherein said first fold line, said second fold line, said first seam, said second seam, said third seam, said fourth seam, and said vents cooperate to provide the box shaped diffuser with a parachute effect during deployment of the air bag cushion.

10. The box shaped diffuser of claim 8, wherein the box shaped diffuser expands in a parachute like manner upon receipt of said inflation gas.

11. The box shaped diffuser of claim 8, further comprising breakaway stitching releaseably connecting a surface of the box shaped diffuser and a portion of the air bag cushion.

12. The box shaped diffuser of claim 11, wherein said breakaway stitching is provided at either said horizontal fold line, said vertical fold line, or both said horizontal fold line and said vertical fold line.

13. A method for making a diffuser for an inflatable cushion of an airbag module, comprising:

providing a rectangular sheet or flexible material, said rectangular sheet comprising a plurality of vent openings, four edges and four corners;

dividing each of said four edges into a pair of sections;

folding and sealing each of said four corners onto said rectangular sheet to define four opening edges; and folding and sealing each of said pair of sections to each other to define an opening, said opening having a periphery defined by said four opening edges.

14. The method as in claim 13, wherein said plurality of vent openings are located to limit deployment of the inflatable cushion in one direction while limiting deployment in another direction when the diffuser is positioned with the inflatable cushion and said opening is in fluid communication with an inflator for inflating the inflatable cushion.

15. A diffuser for an inflatable cushion, comprising:

a flexible material having a rectangular shape with four corners defining four edges wherein each of said four edges is defined into a pair of sections and each of said corners is folded and secured onto said rectangular shape to define four opening edges wherein each of said pair of sections are secured to each other resulting in a diffuser opening being defined by said four opening edges, said diffuser further comprising a plurality of vent openings.

16. The diffuser as in claim 15, wherein said diffuser is configured, positioned and dimensioned to provide a means for limiting deployment of the inflatable cushion in one direction while assisting in deployment of the inflatable cushion in another direction when said diffuser is inserted with the inflatable cushion.

* * * * *